US 6,575,187 B2

(12) United States Patent
Leys et al.

(10) Patent No.: US 6,575,187 B2
(45) Date of Patent: Jun. 10, 2003

(54) THREE-WAY PLASTIC VALVE

(75) Inventors: John A. Leys, Victoria, MN (US); Michael Stoick, Prior Lake, MN (US)

(73) Assignee: Entergris, Inc., Chaska, MN (US)

( * ) Notice: Subject to any disclaimer, the term of this patent is extended or adjusted under 35 U.S.C. 154(b) by 0 days.

(21) Appl. No.: 09/954,472

(22) Filed: Sep. 12, 2001

(65) Prior Publication Data

US 2002/0036017 A1 Mar. 28, 2002

Related U.S. Application Data

(63) Continuation-in-part of application No. 09/274,618, filed on Mar. 23, 1999, now abandoned.

(51) Int. Cl.$^7$ .............................................. F16K 11/048
(52) U.S. Cl. ............................. 137/15.21; 137/315.09; 137/625.5; 137/625.66
(58) Field of Search ........................ 137/625.5, 625.66, 137/15.21, 315.09

(56) References Cited

U.S. PATENT DOCUMENTS

| 3,587,156 A | * | 6/1971 | Sorenson ............... 137/625.66 |
|---|---|---|---|
| 3,788,599 A | | 1/1974 | Cloyd |
| 4,207,923 A | | 6/1980 | Giurtino |
| 4,239,182 A | | 12/1980 | Arnold et al. |
| 4,314,586 A | | 2/1982 | Folkman |
| 4,449,692 A | | 5/1984 | Rhodes |
| 4,520,369 A | * | 5/1985 | Shackleton ............... 137/625.5 |
| 4,574,844 A | * | 3/1986 | Neff et al. ............. 137/625.27 |
| 4,671,461 A | | 6/1987 | Hennuy et al. |
| 4,807,666 A | | 2/1989 | Morse |
| RE34,261 E | * | 5/1993 | Sule ........................ 137/625.5 |
| 5,242,151 A | | 9/1993 | Boehm et al. |
| 5,261,442 A | * | 11/1993 | Kingsford et al. ........ 137/625.5 |
| 5,288,290 A | | 2/1994 | Brody |
| 5,294,093 A | | 3/1994 | Huveteau et al. |
| 5,335,696 A | | 8/1994 | McKenzie |
| 5,575,311 A | * | 11/1996 | Kingsford ................ 137/625.5 |
| 5,779,224 A | | 7/1998 | Fukano et al. |
| 5,791,631 A | | 8/1998 | Martin et al. |
| 5,924,441 A | * | 7/1999 | Leys et al. ............... 137/625.5 |
| 5,967,173 A | * | 10/1999 | Kingsford et al. ........ 137/625.5 |
| 2002/0066488 A1 | * | 6/2002 | Leys et al. ............... 137/625.5 |

* cited by examiner

Primary Examiner—Gerald A. Michalsky
(74) Attorney, Agent, or Firm—Patterson, Thuente Skaar & Christensen

(57) ABSTRACT

A 3-way valve for controlling the flow between first and second ports and a common port. The 3-way valve comprising a valve body having an integral flow portion and a valve stem having first and second valve members. The valve stem is pressfit assembled into the flow portion of the valve body where at least one of the first valve member and the flow portion momentarily deforms. The valve stem operates between a first position where fluid is allowed to flow between the common port and the second port and a second position where fluid is allowed to flow between the common port and the first port.

16 Claims, 5 Drawing Sheets

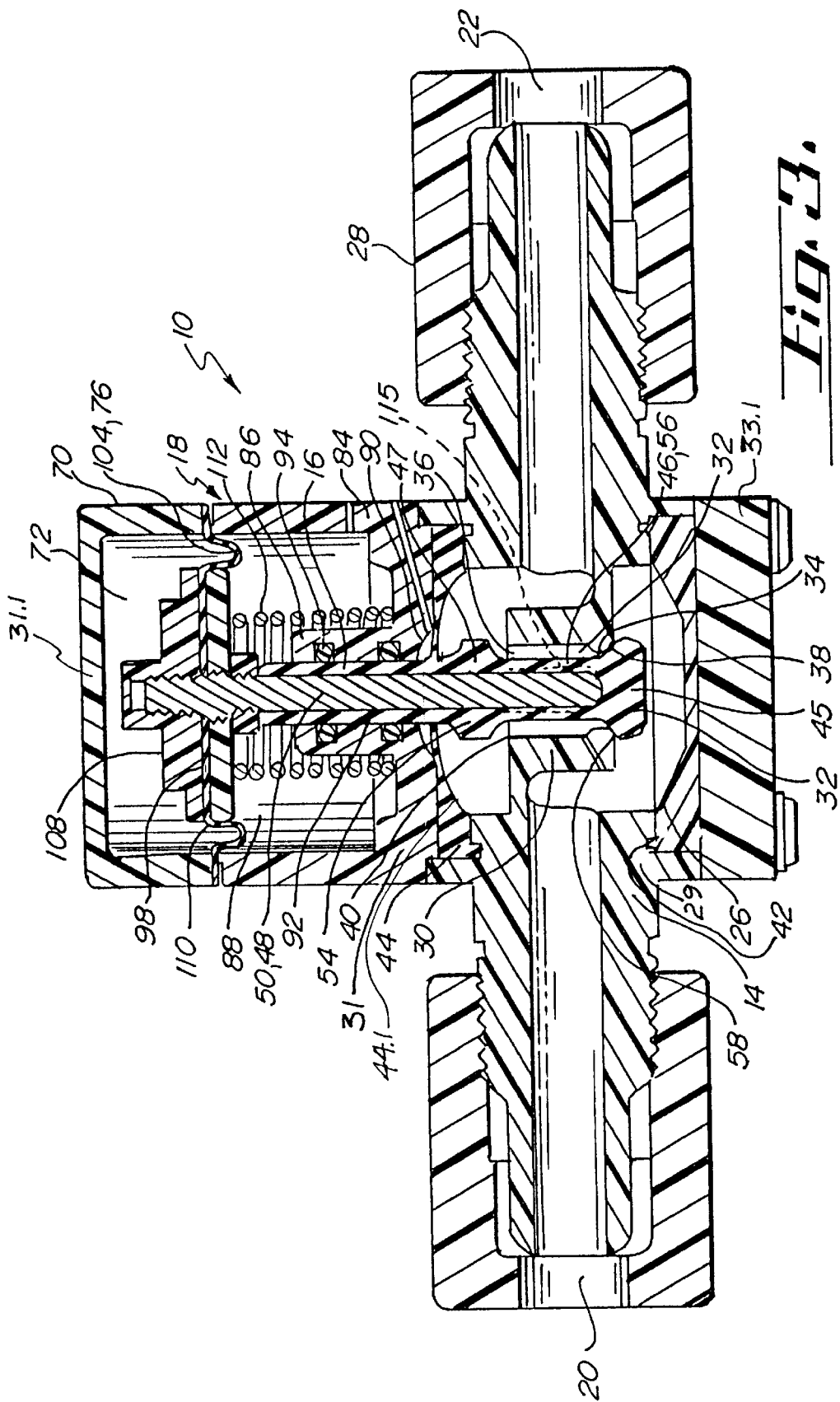

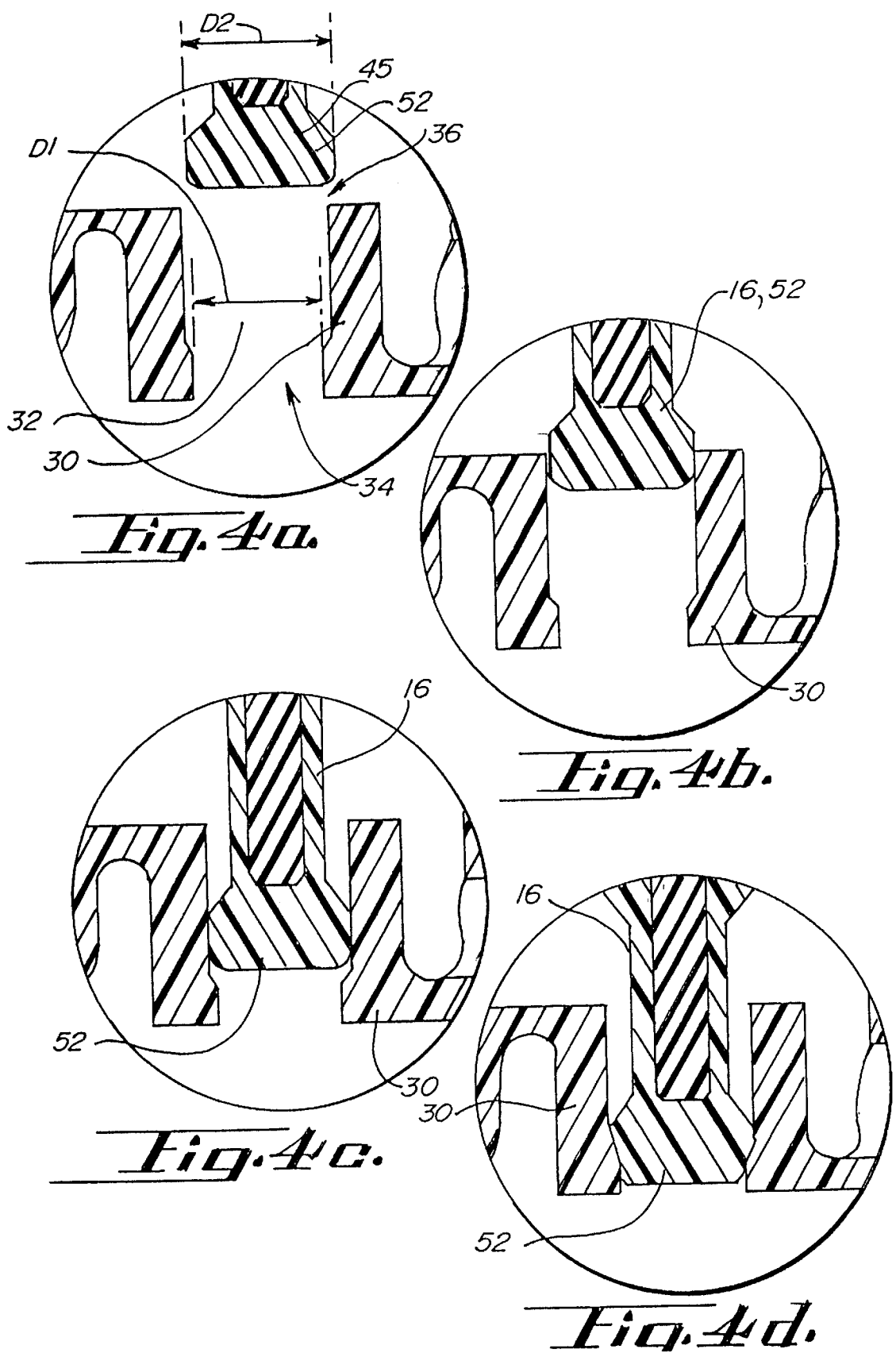

THREE-WAY PLASTIC VALVE

BACKGROUND OF THE INVENTION

This is a continuation-in-part of application Ser. No. 09/274,618 filed Mar. 23, 1999, now abandoned. Said application is incorporated herein by reference.

The present invention generally relates to valves. More particularly, this invention relates to 3-way poppet style valves utilizing valve stems to control the flow of fluid between a common port and two other ports.

Various types of valves are used in the semiconductor industry to transport fluids, including highly caustic fluids. It is essential that these valves do not cause quiescent or dead spots in the fluid flow course which could cause the fluid to become stagnant and degrade or could trap solids resulting in the contamination of the fluid. In addition, it is important that the number of potential leakage sources or seals be kept to a minimum due to the highly caustic fluids often used in the semiconductor industry.

These valves must be made of materials highly resistant to the caustic fluids. Contact with metal parts is generally to be avoided. The components which contact the fluids are typically formed of fluoropolymers such as perfluoroalkoxy (PFA), polyvinylidene (PVDF), or polytetrafluoroethylene (PTFE).

3-way valves, such as the Galtek® valve produced by Entegris, Inc., Chaska, Minn., utilize a valve stem which operates within a flow channel portion of a valve body to control the flow of fluid between a common port and two other ports. These prior art designs utilize valve stems having multiple parts to allow the valve stem to be assembled within the flow channel portion of the valve body. As a result, the cost of manufacturing 3-way valves of this type is dependant upon to the number of components needed to form the valve stem and the steps involved in the assembly of the valve stem within the flow channel portion of the valve body.

There is a need for a 3-way valve utilizing a valve stem having a reduced or minimum number of non-integral components which can be quickly and easily manufactured and assembled within the flow channel portion with a minimal number of steps.

SUMMARY OF THE INVENTION

A 3-way valve comprising a molded fluoropolymer plastic valve body and a valve stem having integrally formed portions, the 3-way valve provides manufacturing advantages and is highly suitable for use with caustic fluids such as those used in semiconductor processing applications. Principal portions of the valve stem and valve body are integrally formed of plastic and are press-fit together minimizing the number of components, the number of joints between components, and the number of steps required to assemble the valve.

In a preferred embodiment, the valve body has a an upper portion containing a pneumatic actuation mechanism, an upper sealing portion, a central body portion, a lower sealing portion, and lower cap portion. The central body portion has a common port, a first port, a second port, all coplanar with one another, and a flow portion having a flow channel. The flow portion has a common port in flow communication with the flow channel, a first port in flow communication with the flow channel through the first valve seat, and a second port in flow communication with the flow channel through the second valve seat. The valve stem comprises an integrally formed fluid control portion in the shape of a figure eight with a first valve member for sealingly engaging the first valve seat, a second valve member for sealingly engaging the second valve seat, and a channel stem portion extending between the first and second valve members. The first and second valve members each having a larger width than the inner diameter of the flow channel. The valve stem may be press fit through the central body portion by deforming at least one of the flow portion of the body portion and the second valve member, resulting in the first valve member being operatively positioned adjacent to the first valve seat, the second valve member being operatively positioned adjacent the second valve seat, and the channel stem portion extending through the flow channel. The upper and lower sealing portions having contoured portions creating a contoured smooth fluid flow courses above and below the first and second valve seats.

The valve stem is moveable between a first position and a second position. In the first position, the first valve member sealingly engages the first valve seat and the second valve member is displaced from the second valve seat, thereby preventing the flow of fluid between the flow channel and the first port while allowing the flow of fluid between the flow channel and the second port. In the second position, the second valve member sealingly engages the second valve seat and the first valve member is displaced from the first valve seat, thereby preventing the flow of fluid between the flow channel and the second port while allowing the flow of fluid between the flow channel and the first port.

A feature and advantage of specific embodiments of the invention is that the valve stem is press-fit assembled within the valve body allowing the 3-way valve to be assembled quickly and efficiently. As a result, the 3-way valve is cheaper to manufacture than present 3-way valves.

Another feature and advantage of specific embodiments of the invention is that the valve stem utilizes a valve stem guide to assure proper alignment of the valve stem and the channel portion.

Yet another feature and advantage of specific embodiments of the invention is that it utilizes a single diaphragm to control the valve thereby reducing the number of components, reducing assembly costs, and allowing the valve to be made smaller than current 3-way valves.

Still yet another feature and advantage of specific embodiments of the invention is that the valve body may be molded rather than machined.

Another feature and advantage of specific embodiments of the invention is that the valve stem can be quickly and easily removed from the flow channel and replaced.

Further disclosure relating to plastic valves suitable for use in the semiconductor processing industry and for handling caustic fluids can be found in U.S. Pat. Nos. 5,335,696; 5,279,328; and U.S. application Ser. No. 08/843,456; now U.S. Pat. No. 5,924,441 all of which are assigned to the assignee of the instant invention. The two patents and the application are hereby incorporated by reference herein.

BRIEF DESCRIPTION OF THE DRAWINGS

FIG. 3 is a side cross-sectional view of the 3-way valve of FIGS. 1 and 2.

FIGS. 4a–e are side cross-sectional views of the valve stem being press-fit through the flow portion of the valve body according to an embodiment of the invention.

DETAILED DESCRIPTION OF THE PREFERRED EMBODIMENTS

Figure 1:
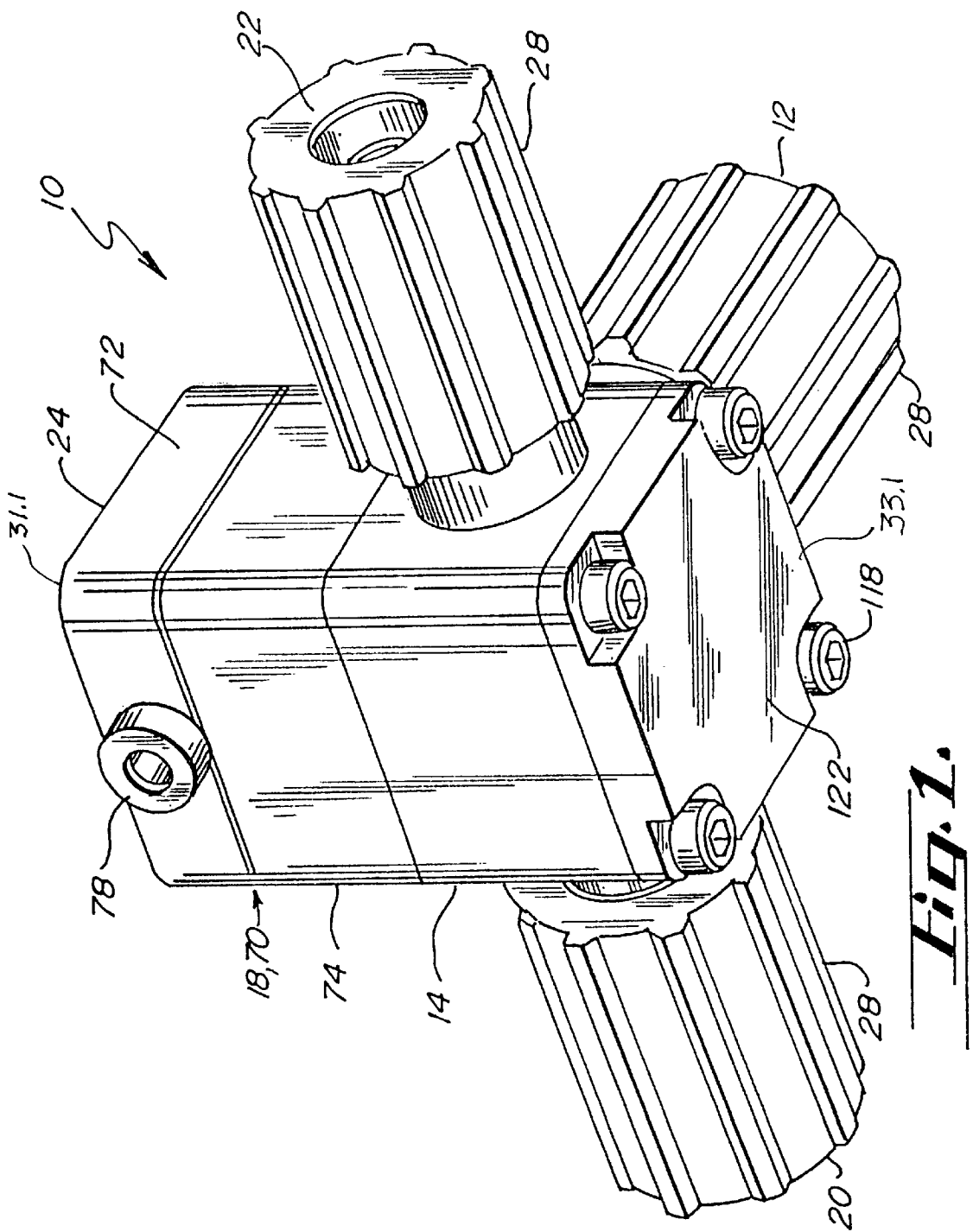
FIG. 1 is a perspective view of a 3-way valve.
Figure 2:
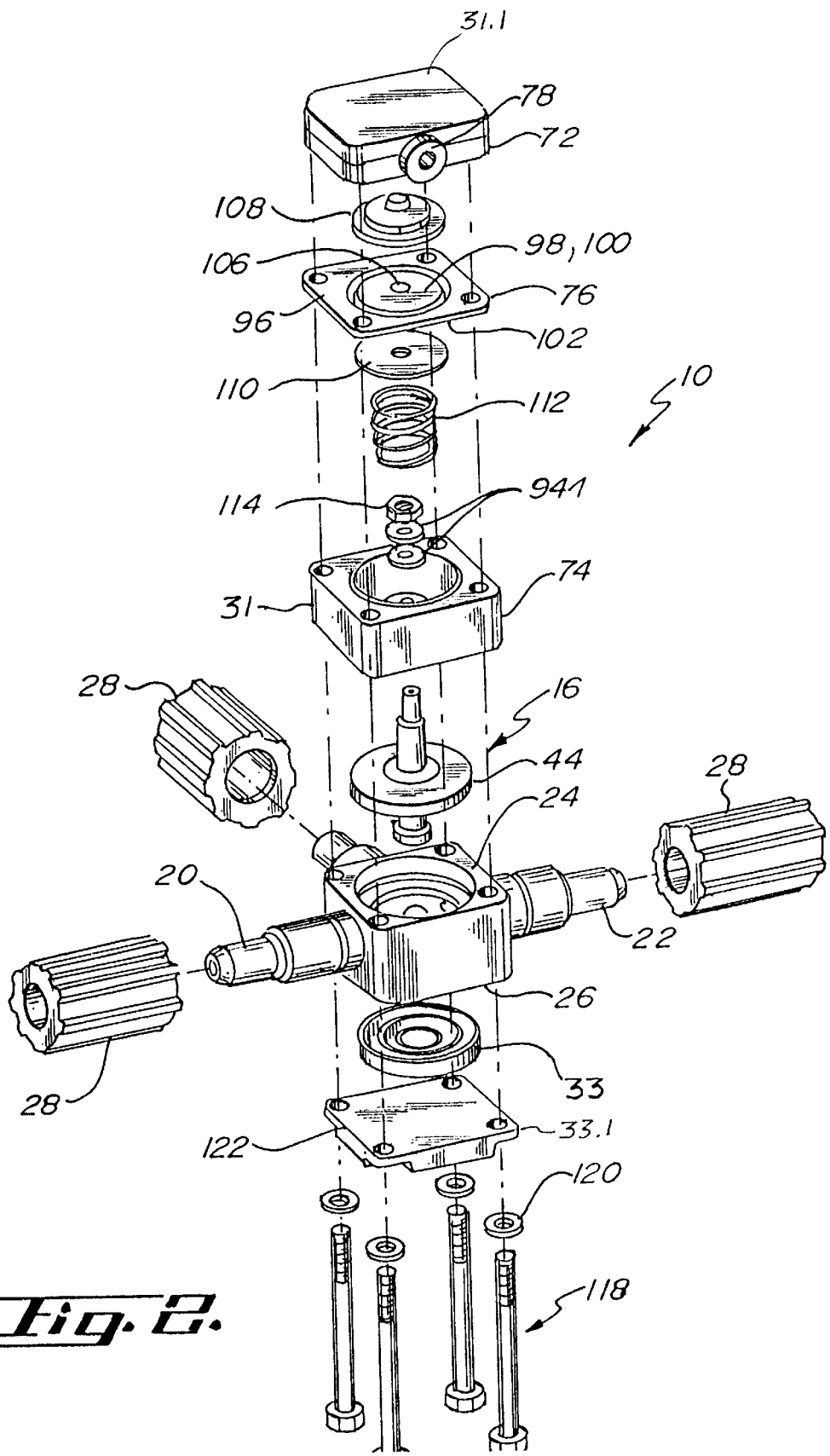
FIG. 2 is an exploded perspective view of the 3-way valve of FIG. 1.

A 3-way valve, designated as numeral 10, for controlling the flow of fluid between a common port 12 and two other ports is shown in FIGS. 1–3. The valve generally comprises a valve body 14, a valve stem 16, and a valve actuator 18.

The valve body 14, best shown in FIGS. 2 and 3, preferably formed of fluoropolymers, through an injection molding and/or machining processes and generally comprises the common port 12, a first port 20, a second port 22, a top 24, and a bottom 26 as shown in FIGS. 1 and 2. Fittings 28 are used to connect the ports of the valve body 14 to tubing and other components (not shown). The valve body 14 further comprises a central body portion 29, a upper body portion 31, an upper cap 31.1, and a lower body portion 33, and a lower cap 33.1. The central body portion may be formed of PFA. The upper body portion may be formed of PVDF. The lower body portion may be formed of PTFE. The lower cap may be formed of PVDF. The upper cap may be formed of PVDF.

The central body portion 29 includes a flow portion 30, shown in FIG. 3, which provides a flow path for fluid communication between the common port 12 and the first and second ports 20, 22. The flow portion 30 defines a flow channel 32 having a minimum inner diameter identified as "D" on FIG. 4a. The flow portion 30 comprises a first inlet 34 in fluid communication with the first port 20, a second inlet 36 in fluid communication with the second port 22, and a common inlet (not shown), positioned between the first and second inlets 34, 36, in fluid communication with the common port 12. First and second valve seats 38, 40 are positioned at the first and second inlets 34, 36, respectively. The lower body portion 33 seals by way of a tongue in groove connection 42 to the bottom 26 of the valve body 14 as shown in FIG. 3.

The valve stem 16, shown in FIGS. 2 and 3, generally comprises a wetted diaphragm 44 configured as a valve stem skirt, a fluid control portion 46, and a control rod 48 made of stainless steel or PEEK. The diaphragm 44 has a concave portion 44.1 The fluid flow portion has a pair of poppets 45, 47. The valve stem skirt 44 is preferably formed integral with the fluid control portion 46 and is configured to seal the top 24 of the valve body 14 and to guide the valve stem 16 along an axially aligned direction as the position of the valve stem 16 is adjusted.

The fluid control portion 46 of the valve stem 16 is an hourglass-shaped portion preferably formed of modified PTFE (NXT70 by Dupont). The fluid control portion 46 controls the closing and opening of the first and second inlets 34, 36, thereby controlling the fluid communication between the common inlet and the first and second inlets 34, 36. In one embodiment of the invention, the fluid control portion 46 comprises a control rod receptacle 50 for receiving the control rod 48, a first valve member 52, a second valve member 54, and a channel stem portion 56 extending between the first and second valve members 52, 54. The first and second valve members 52, 54 each have seat engaging portions 58, 60 for sealing the respective valve seats. The first and second valve members 52, 54 further have outer diameters that are greater than the inner diameters of first and second valve seats respectively. The first valve member 52, configured as the poppet 45, has a diameter D2 as shown on FIG. 4a.

Figure 4E:
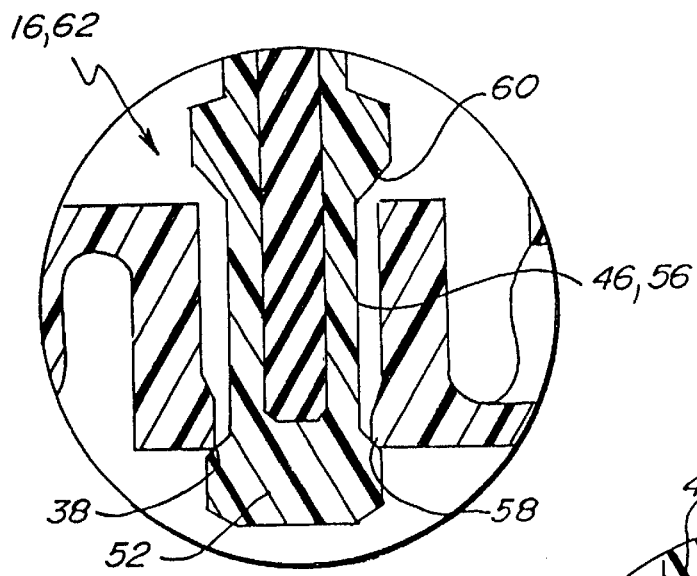
Figure 5:
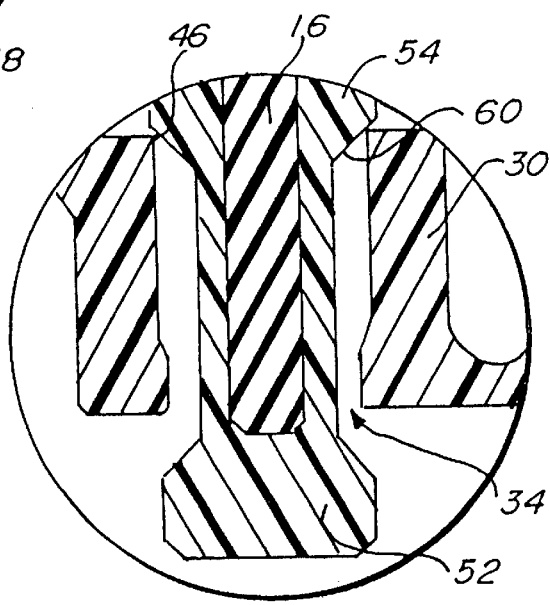
FIG. 5 is a side cross-sectional view of the valve stem in the second position according to an embodiment of the invention.
Figure 6:
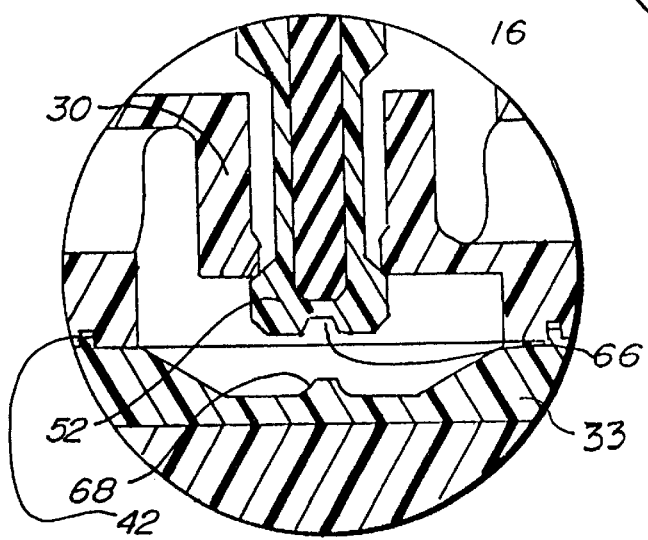
FIG. 6 is a side cross-sectional view of the valve stem according to an embodiment of the invention

The first poppet 45 of the fluid control portion 46 is press-fit assembled within the flow channel 32 of the valve body 14 through the first valve seat 38 resulting in the first valve member 52 being positioned proximate and confronting the first valve seat 38, the second valve member 54 being positioned proximate and confronting the second valve seat 40, and the channel stem portion 56 extending through the flow channel 32, as shown in FIG. 3. When the valve stem 16 is in a first position 62, the seat engaging portion 58 of the first valve member 52 sealingly engages the first valve seat 38 and the second valve member 54 is displaced from the second valve seat 40, thereby closing the first inlet 34 and the first port 20 while opening fluid communication between the common port 12 and the second port 22, as shown in FIGS. 3, 4e, and 6. When the valve stem 16 is in a second position 64, the seat engaging portion 60 of the second valve member 54 sealingly engages the second valve seat 40 and the first valve member 52 is displaced from the first valve seat 38, thereby closing the second inlet 36 and the second port 22 and opening fluid communication between the common port 12 and the first port 20, as shown in FIG. 5.

The first valve member 52 is configured as a poppet and is a bulbous portion facilitating the press-fit through the flow portion 30 of the valve body 14. This press-fitting process is shown in FIGS. 4a–4e. In FIGS. 4a–4d, the first valve member 52 is pressed into the flow channel 32 momentarily deforming at least one of the first valve member 52 and the flow portion 30 due to the interference fit between the first valve member 52 and the flow portion 30. When the first valve member 52 extends beyond the first valve seat 38, both the first valve member 52 and the flow portion 30 return to their non-deformed states as shown in FIG. 4e. As a result, the valve stem 16 can be quickly assembled within the flow portion 30 of the valve body 14. Similarly, the valve stem 16 can be quickly and easily removed from the flow portion 30 by pulling the first valve member 52 through the flow portion 30 of the valve body 14.

An alternative embodiment of the valve stem 16 is shown in FIG. 6. In this embodiment, the first valve member 52 has a valve stem guide portion 66 which cooperates with a valve stem guide portion 68 of the lower body portion 33 to properly align the valve stem 16 when it is in the second position 64. In addition, the control rod receptacle 50 is extended within the first valve member 52 as shown in FIG. 6. In another alternative embodiment of the valve stem 16, the control rod 48 is formed integral with the fluid control portion 46.

The valve actuator 18, best shown in FIGS. 2 and 3, selectively moves the valve stem 16 between the first position 62 and the second position 64. The valve actuator 18 generally comprises a valve actuator housing 70, preferably made of a PDFA, having a pressurizable portion 72 and a bottom portion 74. The pressurizable portion 72 is sealed by an actuator diaphragm 76, preferably made of double coated Viton® and Nomex® available from Dupont, and has an adjustable interior pressure which can be adjusted through a pressure control port 78 between a low pressure setting and a high pressure setting. The bottom portion 74 has a base portion 84, a pedestal 86 extending from the base portion 84, and an open interior 88. The base portion 84 has a concave portion 90 which limits the upward movement of the valve stem 16. The pedestal 86 has a bore 92 sized to receive the valve stem 16. A pair of o-rings 94, contained within the pedestal 86, are configured to form a seal between the pedestal 86 and the valve stem 16.

The diaphragm 76 comprises a shoulder portion 96 which acts to seal the pressurizable portion 72, an extendable planar portion 98 having a top side 100 and a bottom side 102, a flexible ring 104 attaching the shoulder portion 96 to the planar portion 98, and an aperture 106 for receiving the valve stem 16. Top and bottom rigid members 108, 110 attach to the top side 100 and the bottom side 102 of the extendable planar portion 98, respectively, and are used to attach the top portion of the control rod 48 to the diaphragm 76 and to seal the aperture 106 of the diaphragm 76. Other actuation means in addition to the pneumatic means shown also may be utilized. Such means are familiar to those knowlegeable in the art. Such means would include those disclosed in the patents and the application which have been incorporated by reference herein.

The valve stem 16 extends through the bottom portion 74 of the actuator housing 70, the pair of o-rings 94, a spring 112, the bottom rigid member 110, and the aperture 106 of the diaphragm 76, and attaches to the top rigid member 108 at the exposed portion of the control rod 48. A nut 114, attached to the control rod 48, is used to secure the top and bottom rigid members 108, 110 to the planar portion 98 of the diaphragm 76. The control rod 48 may be secured in the fluid control portion 46 by threads 115. Alternatively, the fluid control portion may be overmolded on the rod. Alternatively a single component may be utilized rather than the two components. The spring 112, contained within the open interior 88 of the bottom portion 74, contacts the bottom rigid member 110 and the base of the bottom portion 74 and produces an upward force on the planar portion 98.

The range of motion of the valve stem 16 is typically limited in the upward direction by the first valve member 52 engaging the first valve seat and in the downward direction by the second valve member 54 engaging the second valve seat 40. When the interior pressure of the pressurizable portion 72 is at a non actuating low pressure state, such as shown in FIG. 3, the spring 112 forces the diaphragm 76 and valve stem 16 to move into a first position and causes the valve seat engaging portion 58 of the first valve member 52 to sealingly engage the first valve seat 38 of the flow portion 30. The poppet 45 and valve seat 38 are appropriately configured with respect to one another that the bias provided by the spring 112 as well as the force of any fluid pressure on the poppet 45 are not sufficient to force the poppet or valve member back through the valve seat 38. Moreover, the configuration of the valve actuator housing, after assembly, can provide a further stop to prevent the unintended forcing of the poppet 45 back through the valve seat 38. When the interior pressure of the pressurizable portion 72 is at actuating higher pressure state, the diaphragm 76 and valve stem move into a second position, as shown in FIG. 5, where valve seat engaging portion 58 of the first valve member 52 seats on and sealingly engages the second valve seat 40, but is not sufficient to force the second valve member 54 through or into the second valve seat.

Referring to FIGS. 1 and 2, the assembly of the 3-way valve 10 is completed using four bolts 118 which are each inserted through a washer 120, and a valve lower cap or base 122, the valve body 14, the bottom portion 74 of the actuator housing 70, the diaphragm 76 and into a threaded aperture (not shown) of the pressurizable portion 72 of the actuator housing 70. Tightening of the bolts 118 causes the lower body portion 33 to seal the bottom 26 of the valve body 14, the valve stem skirt 44 to seal the top 24 of the valve body 14, and the diaphragm 76 to seal the pressurizable portion 72 and the bottom portion 74 of the actuator housing 70.

The present invention may be embodied in other specific forms without departing from the spirit or essential attributes thereof, and it is therefore desired that the present embodiment be considered in all respects as illustrative and not restrictive.

What is claimed:

1. A 3-way valve comprising:
    a) a valve body comprising:
        i) an integral central body portion formed of a fluoropolymer, the central body portion having a first downwardly facing valve seat, a second upwardly facing valve seat, the second valve seat positioned above the first valve seat, and a resiliently deformable flow channel extending between the valve seats, the flow channel having a minimum inner diameter;
        ii) an upper body portion formed of a fluoropolymer and not being integral with the central body portion, the upper body portion having a chamber for an actuation mechanism, the upper body portion positioned over the central body portion;
        iii) a lower body portion formed of a fluoropolymer and not being integral with the central body portion, said lower body sealingly engaged with and below the central engagement portion, said lower body portion having a concave portion facing the first valve seat;
        ii) a common port integral with the central body portion, the common port in flow communication with the flow channel;
        iii) a first port integral with the central body portion, the first port in flow communication with the flow channel through the first valve seat; and
        iv) a second port integral with the central body portion, the second port in flow communication with the flow channel through the second valve seat; and
    b) a valve stem comprising an integrally formed fluoropolymer fluid control portion and a diaphragm, the fluid flow portion extending through the first valve seat, the flow channel, and the second valve seat;
        the fluid control portion having a resiliently deformable first valve portion confronting the first valve seat, a second valve portion confronting the second valve seat, and a channel stem portion extending between the first and second valve portions and through the flow channel, the first and second valve portions having respective first and second outside diameters which are greater than the minimum inside diameter of the flow channel, the diaphragm compressed between the upper body portion and the central body portion, the diaphragm sealingly engaged with the central body portion.

2. The 3-way valve in claim 1, further comprising a pneumatic valve actuator positioned in the actuation chamber and connected to the valve stem, the valve actuator configured to move the fluid control portion between a first position and a second position;
    the first valve portion sealingly engaging the first valve seat when the fluid control portion is in the first position thereby preventing the flow of fluid between the flow channel and the first port;
    the second valve portion sealingly engaging the second valve seat when the fluid control portion is in the second position thereby preventing the flow of fluid between the flow channel and the second port.

3. The 3-way valve in claim 2, further comprising a actuator cover extending over the valve actuator thereby enclosing the pneumatic actuator.

4. The 3-way valve in claim 2, wherein the first valve portion is a bulbous portion of said fluid control portion which is formed from a resiliently deformable fluoropolymer material, whereby the bulbous portion is momentarily deformable to facilitate the insertion of the valve stem through the first valve seat, the flow channel, and the second valve seat.

5. The valve of claim 1 further comprising a tongue in groove sealing mechanism between the upper body portion and the central body portion.

6. The valve of claim 1 wherein the fluid control portion has a control rod receiving portion and the valve stem further comprises a control rod inserted into the control rod receiving portion of the fluid control portion.

7. The valve of claim 6, wherein the control rod is connected to the valve actuator.

8. The valve of claim 1, wherein the valve body and the second valve portion further comprise cooperating valve stem guide portions for aligning the valve stem.

9. The valve of claim 1, wherein the fluid control portion of the valve stem is hourglass shaped.

10. A method for manufacturing a 3-way valve comprising the steps of:
    a) injection molding a central PFA valve body having:
        i) an integral flow portion having a first valve seat, a second valve seat, and a flow channel extending between the valve seats having a minimum inner diameter;
        ii) a common port in flow communication with the flow channel;
        iii) a first port in flow communication with the flow channel through the first valve seat; and
        iv) a second port in flow communication with the flow channel through the second valve seat; and
    b) forming a valve stem from a fluoropolymer having an integrally formed fluid control portion and a diaphragm, the fluid flow portion having a first valve member, a second valve member, and a channel stem portion extending between the first and second valve members;
        the first and second valve members having a maximum outer diameters which is greater than the minimum inner diameter of the flow channel;
    c) press-fitting the fluid control portion through the first valve seat, the flow channel, and the second valve seat, whereby at least one of the flow portion of the body portion and the second valve member momentarily deforms, resulting in the first valve member being operatively positioned adjacent to the first valve seat, the second valve member being operatively positioned adjacent the second valve seat, and the channel stem portion extending through the flow channel;
    d) forming from a fluoropolymer a lower body portion with a concave portion;
    e) sealingly engaging the lower body portion to the central body portion;
    f) forming from a fluoropolymer an upper body portion; and
    g) securing the upper body portion on the central body portion and sealingly securing the diaphragm therebetween.

11. The method of claim 10 further comprising the step of insertion of a pneumatic actuator in a chamber in the upper body portion.

12. The method of claim 10 further comprising the step of insertion of a control rod, comprised of one of the set of stainless steel and PEEK, into the fluid control portion of the valve stem.

13. The method of claim 10 further comprising the step of sealing the diaphragm to the central body portion with a tongue and groove connection.

14. A method for manufacturing a 3-way valve comprising the steps of:
    a) forming an integral central fluoropolymer central body portion having:
        i) a flow portion having a first valve seat, a second valve seat, and a flow channel extending between the valve seats having a minimum inner diameter;
        ii) a common port in flow communication with the flow channel;
        iii) a first port in flow communication with the flow channel through the first valve seat; and
        iv) a second port in flow communication with the flow channel through the second valve seat; and
    b) forming a valve stem from a fluoropolymer having an integrally formed fluid control portion having a first valve member, a second valve member, and a channel stem portion extending between the first and second valve members;
        the first and second valve members having a maximum outer diameters which is greater than the minimum inner diameter of the flow channel;
    c) press-fitting the fluid control portion through the first valve seat, the flow channel, and the second valve seat, whereby at least one of the flow portion of the body portion and the second valve member momentarily deforms, resulting in the first valve member being operatively positioned adjacent to the first valve seat, the second valve member being operatively positioned adjacent the second valve seat, and the channel stem portion extending through the flow channel;
    d) forming from a fluoropolymer a lower body portion with a concave portion;
    e) sealingly engaging with a tongue in groove connection the lower body portion to the central body portion with the concave portion facing the first valve seat;
    f) forming from a fluoropolymer an upper body portion with a concave portion; and
    g) securing the upper body portion on the central body portion with the concave portion facing the second valve seat and with a tongue in groove connection therebetween.

15. The method of claim 14 where in the valve stem comprises a diaphragm integral with the fluid flow portion, and the method further comprises the step of securing the diaphragm in between the central body portion and the upper body portion.

16. A 3-way valve manufactured by a process comprising the steps of:
    a) injection molding a central PFA valve body having:
        i) an integral flow portion having a first valve seat, a second valve seat, and a flow channel extending between the valve seats having a minimum inner diameter;
        ii) a common port in flow communication with the flow channel;
        iii) a first port in flow communication with the flow channel through the first valve seat; and
        iv) a second port in flow communication with the flow channel through the second valve seat; and
    b) forming a valve stem from a fluoropolymer having an integrally formed fluid control portion and a diaphragm, the fluid flow portion having a first valve member, a second valve member, and a channel stem portion extending between the first and second valve members;

the first and second valve members having a maximum outer diameters which is greater than the minimum inner diameter of the flow channel;

c) press-fitting the fluid control portion through the first valve seat, the flow channel, and the second valve seat, whereby at least one of the flow portion of the body portion and the second valve member momentarily deforms, resulting in the first valve member being operatively positioned adjacent to the first valve seat, the second valve member being operatively positioned adjacent the second valve seat, and the channel stem portion extending through the flow channel;

d) forming from a fluoropolymer a lower body portion with a concave portion;

e) sealingly engaging the lower body portion to the central body portion;

f) forming from a fluoropolymer an upper body portion; and g) securing the upper body portion on the central body portion and sealingly securing the diaphragm therebetween.

* * * * *